(12) United States Patent
Harden et al.

(10) Patent No.: US 8,505,887 B2
(45) Date of Patent: Aug. 13, 2013

(54) MICRO CELLULAR URETHANE (MCU) PROGRESSIVE RATE BUMP STOP/SPRING AID

(75) Inventors: James D. Harden, Benton Harbor, MI (US); Wade J. Singler, St. Joseph, MI (US)

(73) Assignee: Trelleborg Automotive USA, Inc., South Haven, MI (US)

( * ) Notice: Subject to any disclaimer, the term of this patent is extended or adjusted under 35 U.S.C. 154(b) by 293 days.

(21) Appl. No.: 12/962,687

(22) Filed: Dec. 8, 2010

(65) Prior Publication Data

US 2011/0133380 A1    Jun. 9, 2011

Related U.S. Application Data

(60) Provisional application No. 61/267,502, filed on Dec. 8, 2009.

(51) Int. Cl.
*B60G 11/99* (2006.01)

(52) U.S. Cl.
USPC .............. 267/220; 267/33; 280/124; 280/179

(58) Field of Classification Search
USPC  188/321.11; 267/33, 220, 293; 280/124.179
See application file for complete search history.

(56) References Cited

U.S. PATENT DOCUMENTS

| 4,962,916 | A | * | 10/1990 | Palinkas | 267/153 |
| 5,788,262 | A | * | 8/1998 | Dazy et al. | 280/124.155 |
| 6,149,171 | A | * | 11/2000 | Bono et al. | 280/124.179 |
| 6,254,072 | B1 | * | 7/2001 | Bono et al. | 267/220 |
| 6,439,550 | B1 |  | 8/2002 | Koch |  |
| 7,070,157 | B2 |  | 7/2006 | Huprikar et al. |  |
| 8,317,169 | B1 | * | 11/2012 | Cantolino | 267/141 |
| 2006/0082038 | A1 |  | 4/2006 | Al-Dahhan et al. |  |
| 2009/0057970 | A1 |  | 3/2009 | Leonard |  |
| 2010/0230877 | A1 | * | 9/2010 | Schudt et al. | 267/220 |

FOREIGN PATENT DOCUMENTS

| JP | 2004150596 A | 5/2004 |
| JP | 2006-281811 A | 10/2006 |
| KR | 10-2002-0084912 | 11/2002 |

\* cited by examiner

*Primary Examiner* — Christopher Schwartz
(74) *Attorney, Agent, or Firm* — Gifford, Krass, Sprinkle, Anderson & Citkowski, P.C.

(57) ABSTRACT

The present invention provides an improved Micro Cellular Urethane (hereinafter 'MCU') bump stop/spring aid having a plurality of struts adapted to level the rate transition as sections are folded onto one another. MCU bump stops/spring aids are well known in the art to assist vehicle suspension systems. More particularly, bump stops/spring aids are frequently used with vehicle suspension systems in connection with shocks and strut assemblies. These assemblies provide a comfortable ride in addition to influencing the control and handling of the vehicle. The struts are positioned around the circumference of the MCU bump stop/spring aid. The added struts between the undercuts partially support the outer surfaces of the MCU bump stop/spring aid. Struts are generally molded between the outer surfaces. Struts may also be molded on an inner surface. The plurality of struts improves upon existing technology by improving performance characteristics.

18 Claims, 4 Drawing Sheets

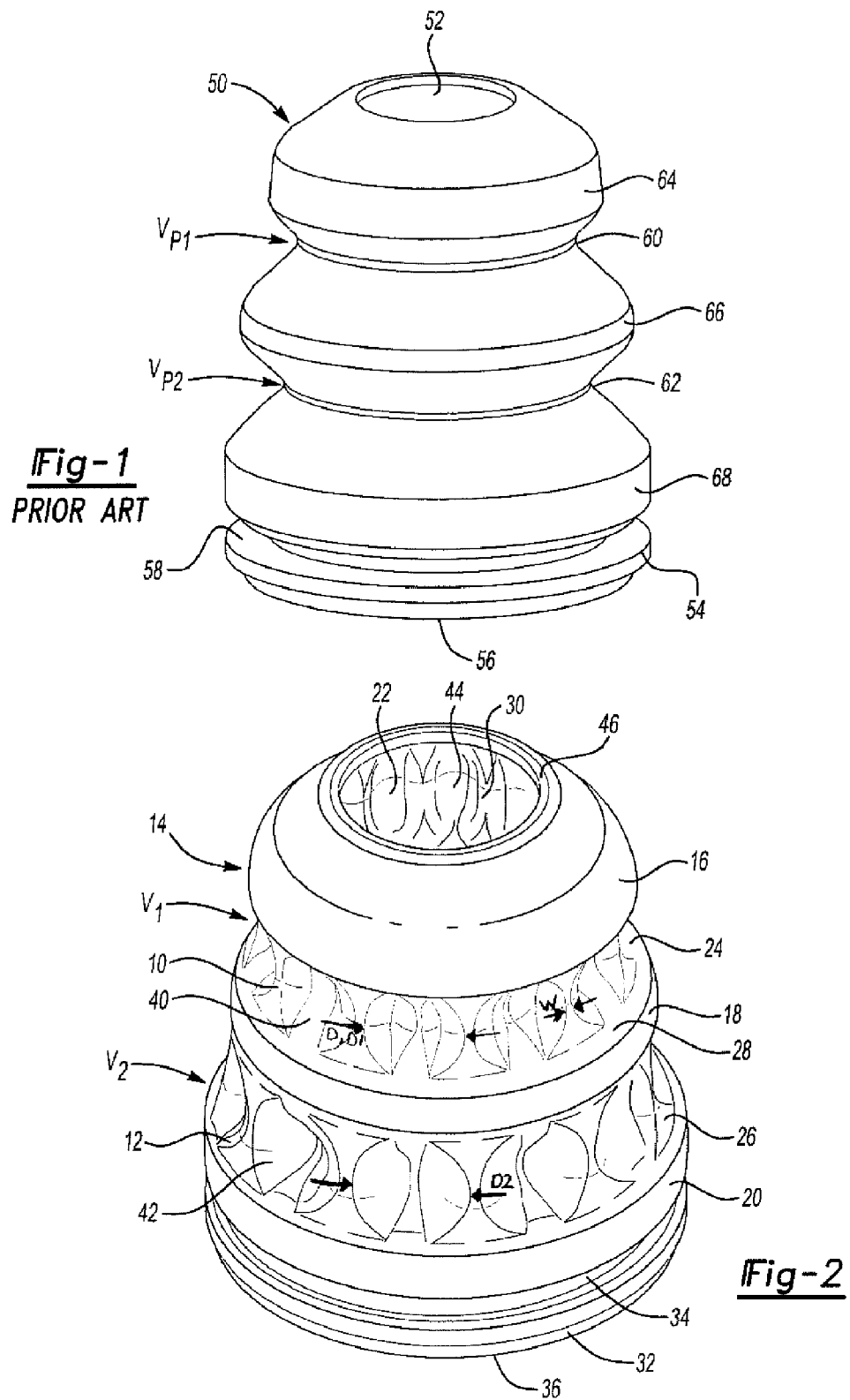

MICRO CELLULAR URETHANE (MCU) PROGRESSIVE RATE BUMP STOP/SPRING AID

CROSS-REFERENCE TO RELATED APPLICATIONS

This application claims priority of U.S. Provisional Patent Application Ser. No. 61/267,502 filed Dec. 8, 2009, which is incorporated herein by reference

FIELD OF THE INVENTION

This invention relates generally to vehicle suspension bump stops, also known as spring aids. More specifically, this invention relates to a micro cellular urethane (MCU) bump stop/spring aid which levels rate transitions in vehicle suspension systems.

BACKGROUND OF THE INVENTION

Micro Cellular Urethane (hereinafter 'MCU') bump stops/spring aids are well known in the art to assist vehicle suspension systems. More particularly, bump stops/spring aids are frequently used in connection with vehicle suspension systems using shocks and strut assemblies. These assemblies provide a comfortable ride in addition to influencing the control and handling of the vehicle. Bump stops/spring aids are commonly designed using undercuts to promote folding of the bump stop/spring aid material. Folding of a bump, stop/spring aid is particularly desirable because it allows compression of the bump stop/spring aid without lateral expansion of the bump stop/spring aid. However, undercut resultant folding does not produce a regular spring rate progression versus deflection curve with respect to certain handling events. Accordingly, a MCU bump stop/spring aid which produces a regular spring rate versus deflection curve with respect to handling events is particularity desirable.

SUMMARY OF THE INVENTION

The present invention provides an improved Micro Cellular Urethane (hereinafter 'MCU') bump stop/spring aid having a plurality of struts adapted to level the rate transition as sections are folded onto one another. MCU bump stops/spring aids are well known in the art to assist vehicle suspension systems. More particularly, bump stops/spring aids are frequently used with vehicle suspension systems in connection with shocks and strut assemblies. These assemblies provide a comfortable ride in addition to influencing the control and handling of the vehicle. The struts are positioned around the circumference of the MCU bump stop/spring aid. The added struts between the undercuts partially support the outer surfaces of the MCU bump stop/spring aid. Struts are generally molded between the outer surfaces. Struts may also be molded on an inner surface. The plurality of struts improves upon existing technology by improving performance characteristics.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is a perspective view of the prior art;

FIG. 2 is a perspective view of an MCU bump stop having a plurality of struts disposed on an outer surface of the bump stop;

DETAILED DESCRIPTION

Figure 3:
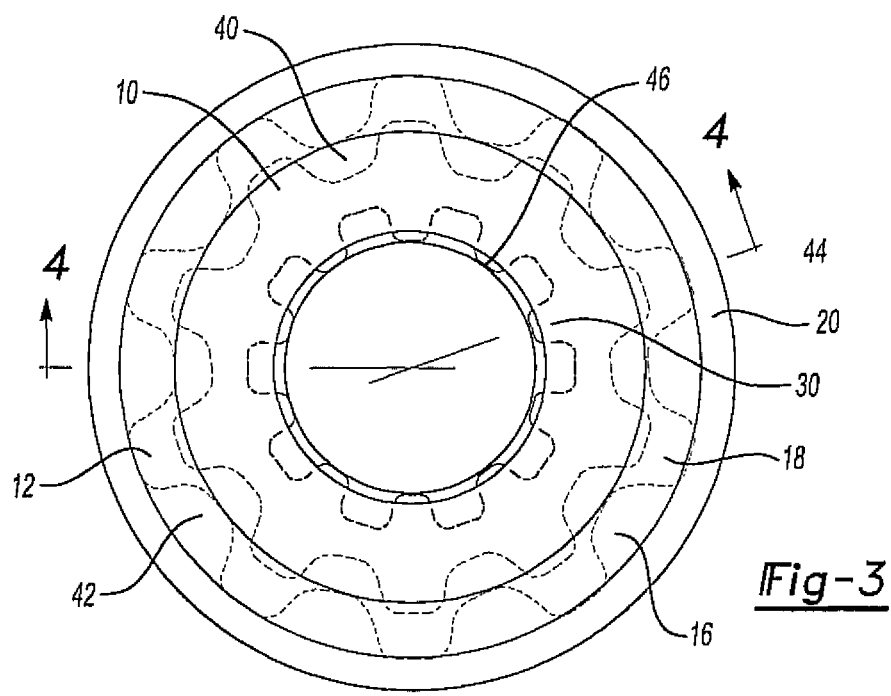
FIG. 3 is a top view of the MCU bump stop having a plurality of struts disposed on an outer surface of the bump stop as shown in FIG. 1.
Figure 4:
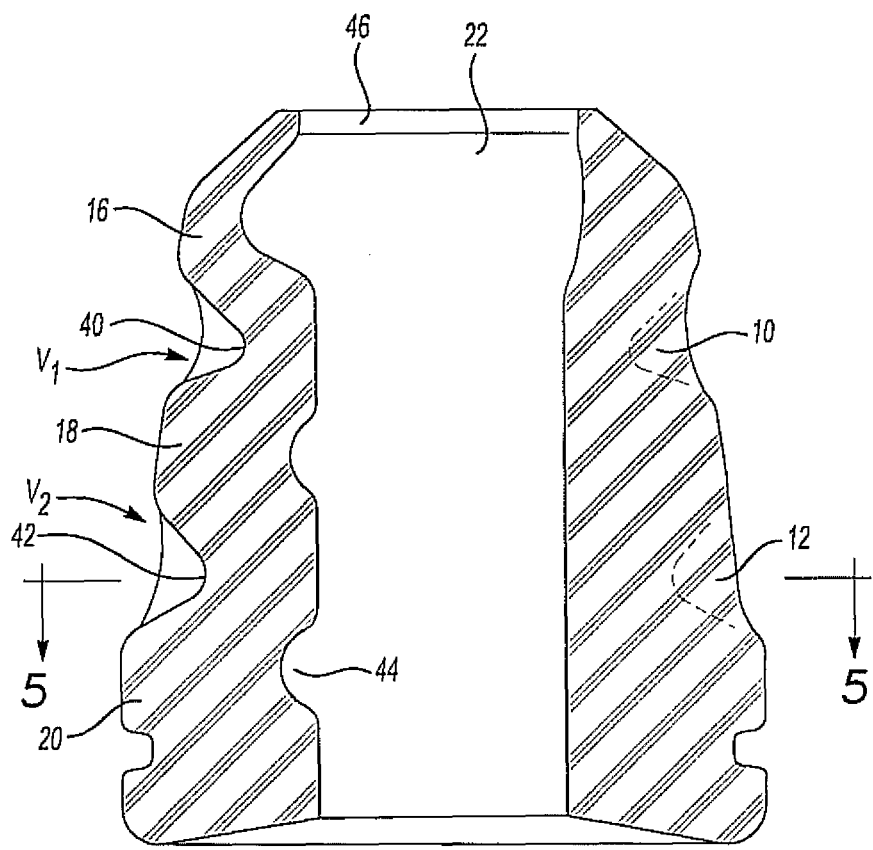
FIG. 4 is a cross sectional view of the bump stop along the section 3-3 of FIG. 2.
Figure 5:
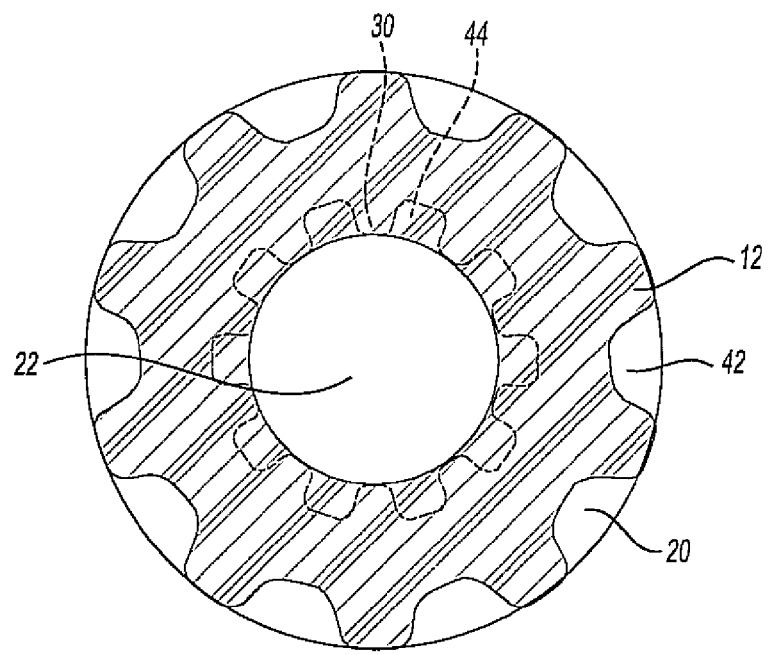
FIG. 5 is a cross sectional view of the bump stop along the section 4-4 of FIG. 3.

Micro Cellular Urethane (hereinafter 'MCU') bump stops/spring aids are well known in the art to assist vehicle suspension systems. More particularly, bump stops/spring aids are frequently used with vehicle suspension systems in connection with shocks assemblies. These assemblies provide a comfortable ride in addition to influencing the control and handling of the vehicle. Bump stops/spring aids are commonly designed using undercuts to promote folding of the bump stop/spring aid material. Accordingly, a MCU bump stop/spring aid which produces a regular spring rate versus deflection curve with respect to handling events is particularity desirable. Creation of a regular spring rate versus deflection curve is created with the implementation of struts 10, 12 on the spring aid/bump stop 14.

The struts 10, 12 are positioned where the undercuts would ordinarily be incorporated on the bump stop 14. The added struts 10, 12 partially support the outer surfaces 16, 18, 20 of the bump stop 14. The struts 10, 12 are generally molded between the outer surfaces 16, 18, 20. The struts 10, 12 may also be molded on an inner surface 22. The plurality of struts 10, 12 improves upon existing technology by improving performance characteristics.

The bump stop 14 must be shaped to fold at predetermined points to decrease lateral expansion during compression. To assist folding at predetermined points, a first undercut 24 and a second undercut 26 are provided on an outer surface 28 of the bump stop 14 to induce "folding" of the bump stop 14 material. The undercuts 24, 26 allow for regular folding of material during compression.

The prior art bump stop 50 (FIG. 1) further includes an inner diameter 52 and a lower member 54. The lower member 54 includes a lower surface 56 and an upper surface 58. The lower member 54 may be made from metal or a polymer material. The configuration of the bump stop 50, however, does not create a constant rate versus displacement progression. The rate versus displacement progression of the bump stop 50 produces a high change in rate during rate development in compression. The undercuts 60, 62 allow for regular folding of material during compression, however, the undercuts 60, 62 can lead to rate changes as folding occurs. Accordingly, a MCU bump stop which produces a constant rate versus displacement progression is highly desirable.

The prior art bump stop 50 is further defined by volume $V1_{1P}$. Volume $V1_{1P}$ is defined by the space between an upper outer surface 64 and a middle outer surface 66. Furthermore, the bump stop 50 is also defined by volume $V1_{2P}$. Volume $V1_{2P}$ is defined by the space between middle outer surface 66 and lower outer surface 68. Volumes $V1_{1P}$, $V1_{2P}$ my additionally be referred to as the free volume of the bump stop 50.

FIG. 2 is a perspective view of one embodiment of a modified MCU bump stop 14. The bump stop 14 includes an upper outer surface 16, a middle outer surface 18 and a lower outer surface 20, collectively referenced as the outer surfaces 16, 18, 20. The bump stop 14 further includes an inner diameter 30 configured to accept an elongated member such as on a strut, as one part of a shock assembly. The inner diameter 30 is further be defined with the inner surface 22. The bump stop 14 also includes a lower member 32. Lower member 32 of the bump stop 14 includes an upper surface 34 and a lower surface 36. Lower member 32 of the bump stop 14 is be affixed to the bump stop 14. The lower member 32 may be made from metal, polymer or plastic material.

The MCU bump stop 14 further includes a plurality of struts 10, 12. The plurality of struts 10, 12 improves upon existing technology by improving performance characteristics. The MCU bump stop 14 has a plurality of generally circular indentations 40, 42. Indentations 40, 42 are positioned between the struts 10, 12. Furthermore, the indentations 40, 42 may include additional ribs or other structure to better support the structure. The plurality of struts 10, 12 are positioned across the outer circumference of the MCU bump stop 14. The plurality of struts 10, 12 are positioned between the upper outer surface 16 and the middle outer surface 18. The struts 10 actively support the upper outer surface 16 and the middle outer surface 18. The plurality of struts 12 are positioned between the middle outer surface 18 and the lower outer surface 20. The struts 12 actively support the middle outer surface 18 and the lower outer surface 20.

Each strut 10, 12 has a width W. Struts 10 positioned between the upper outer surface 16 and the middle outer surface 18 have the approximately the same width W as the struts 12 positioned between the middle outer surface 18 and the lower outer surface 20. Furthermore, the indentations 40, positioned between the upper outer surface 16 and the middle outer surface 18, have a first dimension D1. The indentations 42, positioned between the middle outer surface 18 and the lower outer surface 20, have a second dimension D2. The ratio between dimensions D1, D2 and W may vary accordingly to desired rate versus displacement characteristics. The ratio D1:W ordinarily ranges between 6:1 to 16:3. The D2:W ratio ordinarily ranges between 8:1 to 20:3. These ratios may be changed to accommodate various design characteristics such as rate change.

The MCU bump stop 14 is further defined by volume $V2_1$. Volume $V2_1$ is defined by the space between an upper outer surface 16 and a middle outer surface 18. Furthermore, the MCU bump stop 14 is also defined by volume $V2_2$. Volume $V2_2$ is defined by the space between middle outer surface 18 and lower outer surface 20. Volumes $V2_1$, $V2_2$ my additionally be referred to as the free volume of the MCU bump stop 14. When compared to the prior art as shown in FIG. 1, the volumes $V2_1$, $V2_2$ are 20% to 80% of the total volumes $V1_{1P}$, $V1_{2P}$ of the prior art bump stop 14 (FIG. 1). The decrease in volumes $V2_1$, $V2_2$ of the MCU bump stop 14 provide for greater rigidity and improved rate characteristics.

While the struts 10, 12 improve structure rigidity, the indentations 40, 42 promote folding of the MCU bump stop 14. Structure created from the struts 10, 12 used in combination with the removed material caused from the indentations 40, 42 create a generally constant rate versus displacement graph. This constant rate produced by the MCU bump stop/ spring aid 40 generates a smoother ride to the driver and passengers of a vehicle. The struts 10, 12 supply intermediate rate component that levels the rate transition as sections are folded onto one another.

Figure 6:
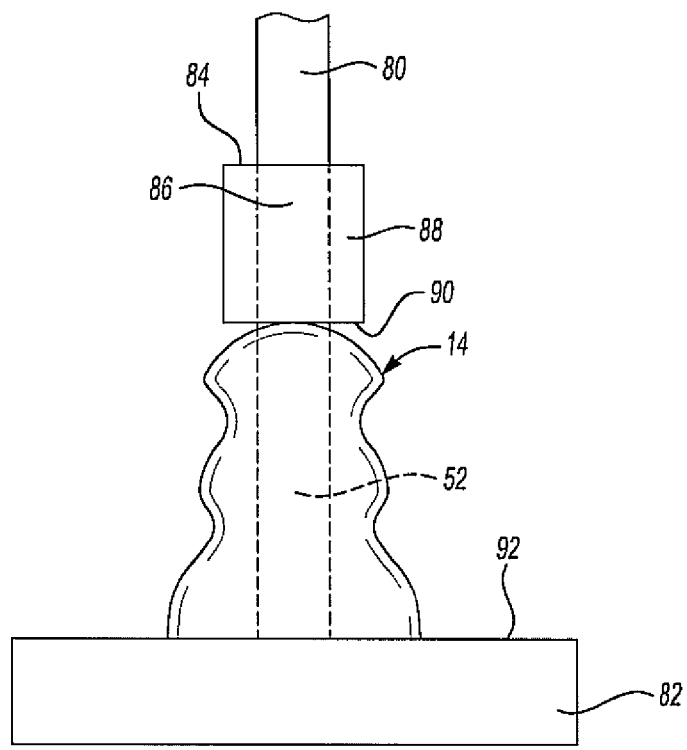
FIG. 6 is a side view of the environmental view including the bump stop.

The MCU bump stop 14 is used in connection with strut assemblies in vehicle suspension systems. The MCU bump stop 14 is routinely under compression situations. As an illustrative example, FIG. 6 depicts the MCU bump stop 14 mounted on a rigid rod 80. The rigid rod 80 may be a strut rod or other suspension component. A nonmoving rigid member 82 is disposed under the MCU bump stop 14 wherein the MCU bump stop 14 rests upon the rigid member 82. The rigid member 82 includes a first surface 92 where the MCU bump stop 14 rests. The rigid member 82 may be a plate, cylinder, strut assembly or other suspension component. Furthermore, a moveable component 88 is provided disposed on the rod 80 having an aperture 86. The movable component 88 is movable along the rod 80 and includes a first surface 84 and a second surface 90. The movable component 88 is movable to compress the MCU bump stop 14 on the rigid member 82. When compressed, the suspension characteristics and qualities of the assembly are improved when using the MCU bump stop 14 versus the prior art bump stop 50. The movable component 88 may be a spring, air bellow or other suspension component.

Figure 7:
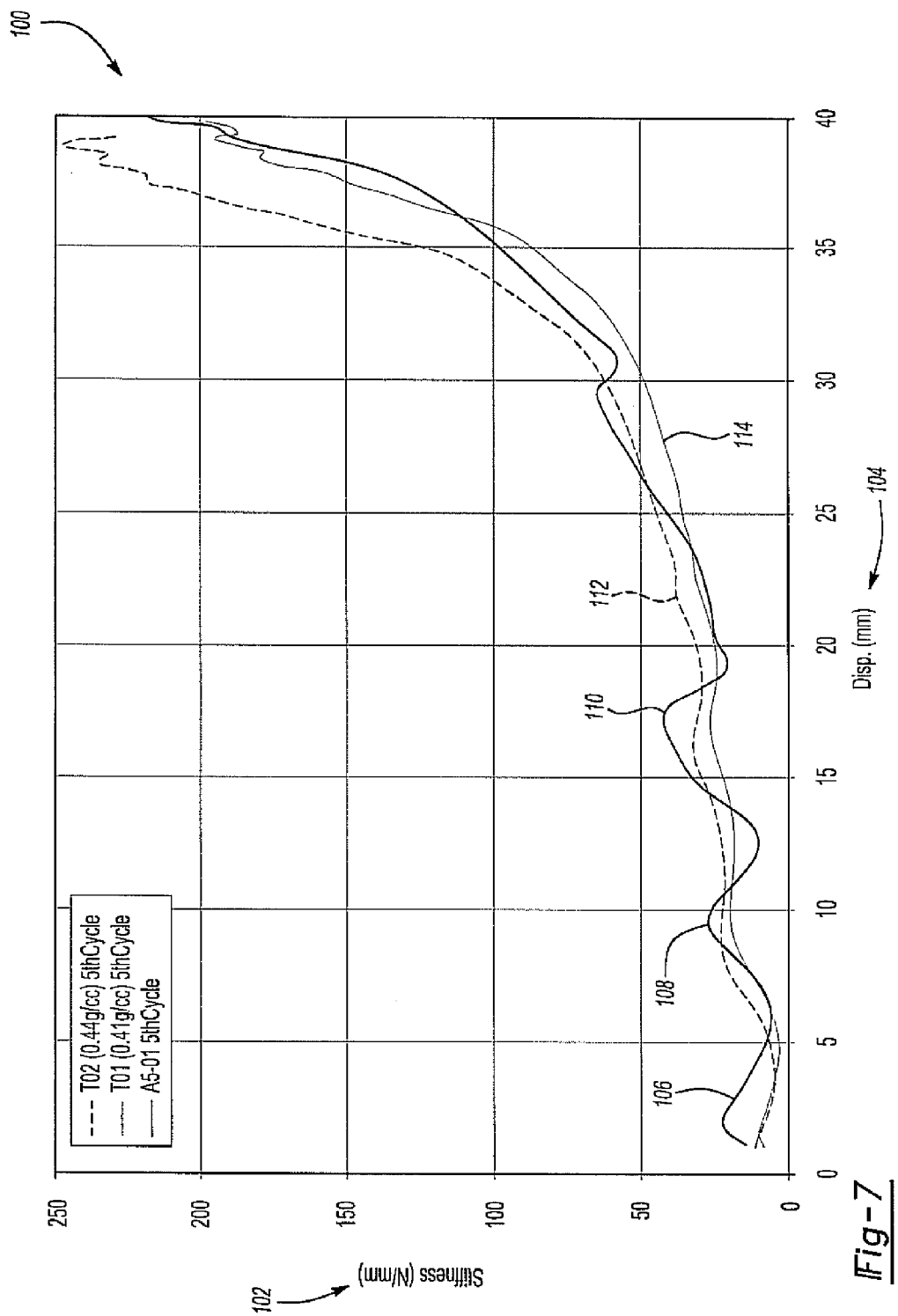
FIG. 7 is a graphical representation of the displacement versus stiffness performance of the prior art and present bump stop.

FIG. 7 is a graphical representation of the MCU bump stop 14 depicted in FIG. 2. The graph shows displacement 104 (mm) versus stiffness 102 (N/mm). Derivative curve 106 shows the rate transitions of the prior art bump stop 50 during compression. Spikes 108, 110 indicate the increase in stiffness as during the folding of the prior art bump stop 50. Derivative curves 112, 114 demonstrate the rate transitions of the MCU bump stop 14 during compression. The curves 112, 114 are visibly more regular when compared to the curve 106. The curves 112, 114 clearly demonstrate a generally constant rate versus displacement graph. Derivative curves 112, 114 represents the rate transitions of the MCU bump stop 14 during compression. Each derivative curve 106, 112, 114 shows rate transitions as the MCU bump stop 14, 50 folds in compression. Derivative curves 112, 114 showing the present MCU bump stop 14 shows significantly less change in rate during rate development in compression.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

The invention claimed is:

1. A vehicle suspension bump stop adapted to improve rate transitions, the bump stop comprising:
    a one piece body having a first portion and a second portion, the first portion connected to the second portion;
    a plurality of struts extending between the first portion and the second portion, the plurality of struts each having two spaced apart side edges, the side edges connecting the first portion and the second portion, the side edges curving in towards one another, the plurality of struts defining a plurality of indentations between each of the plurality of struts and between the first portion and the second portion,
    wherein the struts improve rate transition during compression.

2. The vehicle suspension bump stop of claim 1, wherein the bump stop is made of micro cellular urethane (MCU).

3. The vehicle suspension bump stop of claim 2, wherein a second plurality of struts extends between the second portion and the third portion.

4. The vehicle suspension bump stop of claim 3, wherein the second plurality of struts forms a second plurality of indentations between each of the second plurality of struts and between the second portion and the third portion.

5. The vehicle suspension bump stop of claim 3, wherein the second portion and the third portion are connected.

6. The vehicle suspension bump stop of claim 1, wherein one of the plurality of struts has a first surface.

7. The vehicle suspension bump stop of claim 6, wherein the plurality of struts each includes a second surface.

8. The vehicle suspension bump stop of claim 7, wherein the second surface connects to the bump stop.

9. The vehicle suspension bump stop of claim 6, wherein the first surface faces away from the bump stop.

10. The vehicle suspension bump stop of claim 1, wherein the plurality of struts are further defined by a common width W.

11. The vehicle suspension bump stop of claim 10, wherein the plurality of indentations are further defined by a common dimension D.

12. The vehicle suspension bump stop of claim 11, wherein a predetermined ratio D:W further defines the bump stop.

13. The vehicle suspension bump stop of claim 12, wherein the predetermined ratio D:W ranges between 6:1 to 16:3.

14. The vehicle suspension bump stop of claim 1, wherein a center bore extends through the length of the bump stop.

15. The vehicle suspension bump stop of claim 14, wherein the center bore is further defined by an inner surface.

16. The vehicle suspension bump stop of claim 15, wherein the inner surface of the center bore includes a third plurality of struts.

17. The vehicle suspension bump stop of claim 1, wherein a third portion is disposed below the second portion.

18. The vehicle suspension bump stop of claim 1, wherein the first portion is disposed below the second portion.

* * * * *